March 18, 1969 P. T. HIGGINS 3,433,260

INTEGRATED CIRCUITS AND METHODS OF MANUFACTURE

Filed Jan. 17, 1966 Sheet 1 of 2

INVENTOR.
PAUL T. HIGGINS

BY

Richard T. Seeger
ATTORNEY

INVENTOR.
PAUL T. HIGGINS
BY
Richard J. Seeger
ATTORNEY

United States Patent Office 3,433,260
Patented Mar. 18, 1969

3,433,260
INTEGRATED CIRCUITS AND METHODS OF MANUFACTURE

Paul T. Higgins, Birmingham, Mich., assignor to The Bendix Corporation, Southfield, Mich.

Filed Jan. 17, 1966, Ser. No. 521,090
U.S. Cl. 137—608 4 Claims
Int. Cl. F15c *1/08;* F15d *1/14*

ABSTRACT OF THE DISCLOSURE

This disclosure describes fluidic circuit elements having regular polygonal shapes which may be placed side-by-side in an abutting relationship to form a fluidic circuit. By establishing the passageways through the elements with ports at the midpoints of the abutting sides and normal thereto, fluid flow between the elements is unimpeded by sharp angle turns and easily passes from one element to the next.

This invention pertains to integrated circuits and methods of their manufacture and more particularly to circuits which can be miniaturized and which provide for fluid paths between elements which have a minimum of leakage and transitional mismatch and which also minimize connecting paths. Such circuits are particularly useful for interconnecting a plurality of fluid state amplifiers.

It is an object of this invention to accomplish the above advantages by forming individual amplifier, control, supply, and output channels and circuits in separate discs which have polygonal perimeters. The polygons are preferably regular and may be triangular, square, hexagonal, octagonal, etc., or combinations of these configurations. The individual polygons are placed in a honeycomb or mosaic with each polygon having a plurality of sides abutting adjacent polygons. The polygons have circuits with inlet and outlet passages which intersect a polygon side and by forming these passages at predetermined locations and angles with the respective polygon side, fluid tight contacts and smooth transition of fluid flow from one polygon circuit to another is assured. The passages preferably are formed centrally of the respective polygon sides and are normal to the sides so that the polygon may be turned a number of ways in the mosaic and will be able to be matched perfectly with a corresponding passage in an adjacent polygon.

Another object is to form each of the polygons into thermoplastic rods having a constant polygonal cross section along the length thereof and each having fluid circuits formed throughout the length of the rod. The polygonal rods are then secured to each other with the desired orientation so that the correct passages are in communication, and the billet thus formed is then heated and drawn to a predetermined length to reduce the cross section of each polygon proportionately and with the circuits within the polygons being likewise reduced proportionately. This results in very accurate miniaturized integrated circuits. The drawn billet is then sliced into a large number of identical integrated circuit discs.

Figure 1:
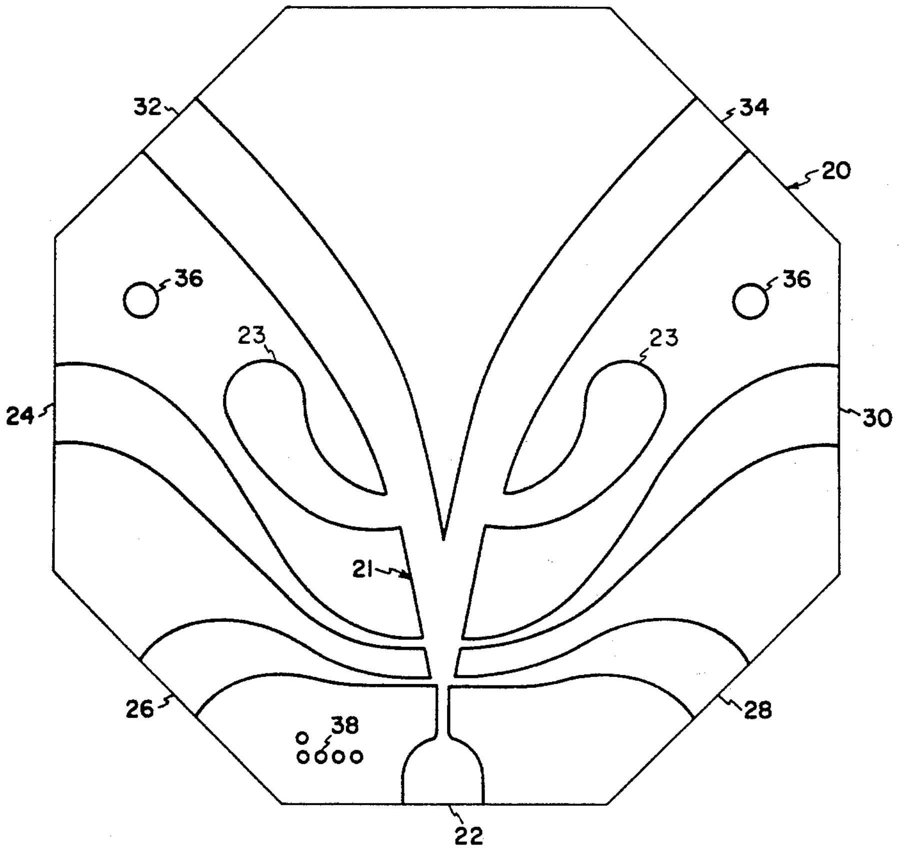
Figure 2:
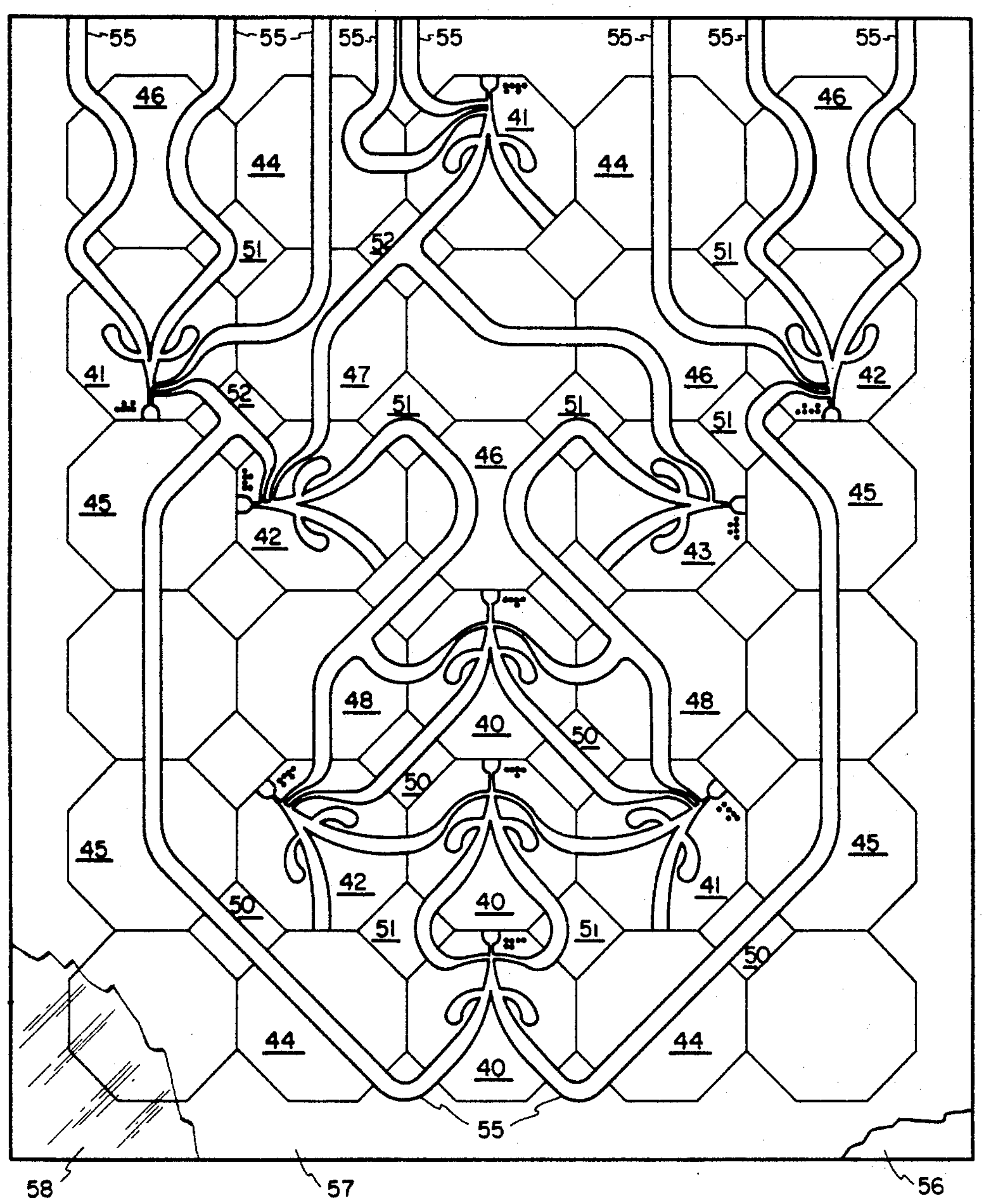

These and other objects of this invention may be seen when a preferred embodiment of this invention is discussed in connection with the drawings in which:

FIGURE 1 is a greatly enlarged view of a single polygonal disc having a fluid state amplifier formed therein; and FIGURE 2 shows an enlarged view of a plurality of the discs of FIGURE 1 along with other connecting discs having connecting passages between the amplifiers formed into a mosaic or integrated circuit disc.

In FIGURE 1, an octagonal disc 20 has formed therein a well known fluid amplifier circuit 21 known as a jet-on-jet or beam deflector amplifier. This circuit has supply port 22, vents 23, control ports 24, 26, 28, 30 and load ports 32, 34. In this embodiment, each of the ports are formed centrally of the respective polygon sides and are normal thereto facilitating connection to ports in adjacent polygon discs as will be described for FIGURE 2.

In FIGURE 2 is shown a plurality of octagonal amplifier polygon discs 40–43 which are formed into a mosaic with connecting octagonal discs 44–48 and square discs 50–52 having connecting passages to obtain a desired multiamplifier element circuit.

The polygonal circuit discs may be formed in the following manner. A water soluble glass material, which may have 40–50 percent by weight of $B_2O_3$, 17–20 percent $Na_2O$ and 34–40 percent $SiO_2$, is made into the form of each of the amplifier circuits 21. This may be done by placing a number of small diameter water soluble glass rods in a series of templates, gluing the ends of the rods together, and then removing the templates providing a water soluble core. Then, a plurality of ordinary glass rods, which are not water soluble, may be packed in all of the crevices of the core and the glass rods are placed in octagonal fixtures to produce the outline shown in FIGURE 1. The glass rods may then be cemented together.

All of the octagonal rods may be formed in this manner and properly assembled and oriented in the manner shown for the integrated circuit billet of FIGURE 2. A rim 57 of ordinary non water soluble glass is placed around the discs and at appropriate places in rim 57, rods of water soluble glass are placed to provide the passages 55. The billet may be heated and drawn until the entire circuit is reduced by the desired factor. After drawing, the billet may be sliced into discs, each of which is identical to every other disc and each of which comprises a complete amplifier circuit. Each disc may be fused or otherwise bonded to a sealing plate 56, such as a non-water soluble glass plate. The water soluble core may then be dissolved away by placing the disc-backing plate assembly in heated water so that passages through the discs are provided where indicated by the fluid amplifier and connecting lines. A cover plate 58 of glass or metal, is then placed over and bonded on the disc-backing plate assembly. Communication holes to the supply ports 22 and vents 23 and some of the control ports are formed in the cover plate.

It can be seen by looking at FIGURE 2 that due to the location of the passages in the amplifier and connecting discs, that from a few standard discs, many different circuit configurations are possible by simply orienting each disc relative to other discs. Also, it may be seen that there are no abrupt fluid transitions between the passage of one element and the passage of a connecting element since the passages are normal to the abutting sides and, therefore, have axes which are rectilinearly aligned.

Also, due to the nature of the regular polygons, very tight fits are provided between adjacent polygons minimizing leakage paths between connecting elements.

Further, the length of connecting paths between amplifiers is minimized thereby improving circuit performance. In many instances in FIGURE 2, a port from one amplifier element is connected directly to a second amplifier element 20 with no connecting disc or element therebetween.

And, since the individual elements are assembled before drawing, they are, therefore, larger, easier to handle, and easier to check for circuit accurateness.

On each amplifier element appears identification dots 38, which provide for quick identification of the type of fluid amplifier circuit provided on the element which otherwise would be very difficult to determine.

Locating holes 36 provide for easy alignment of elements that are placed one on top another. Locating pins, not shown, may be inserted in the holes to accomplish the alignment.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Apparatus comprising a plurality of polygonal members having their sides abutting one another in a mosaic, a plurality of said members each having passage means with at least one input port and one output port, said passage means being defined by perforations in said members, the input port of one of two abutting sides of adjacent members being aligned with the output port of the other of two abutting sides, and the passages of the adjacent members being rectilinearly aligned thereby providing a smooth transition therebetween and minimizing connecting elements between said input and output ports, said input and output ports bisecting their respective polygon member sides.

2. The apparatus of claim 1 with said polygonal members being regular polygons thereby simplifying orientation of the members and insuring fluid tight connections between passage means.

3. The apparatus of claim 2 with said passage means at the input and output ports being normal to their respective polygon sides.

4. The apparatus of claim 2 with said polygonal members comprising a first set of members having a given number of sides and a second set of members having one half of said given number of sides.

References Cited

UNITED STATES PATENTS

| | | | |
|---|---|---|---|
| 3,148,691 | 9/1964 | Greenblott | 137—81.5 |
| 3,171,421 | 3/1965 | Joesting | 137—81.5 |
| 3,207,168 | 9/1965 | Warren | 137—81.5 |
| 3,201,041 | 8/1965 | Welsh | 235—201 |
| 3,229,705 | 1/1966 | Norwood | 137—81.5 |
| 3,234,963 | 2/1966 | Lyon | 137—608 |
| 3,306,538 | 2/1967 | McCracken | 235—201 |
| 3,323,550 | 6/1967 | Lee | 137—81.5 |

OTHER REFERENCES

"Modular Pneumatic Logic Package," Langley et al., I.B.M. Technical Disclosure Bulletin, vol. 6, No. 5, October, 1963, pp. 3 and 4. (Copy in Gp. 360, 137–81.5 and Scientific Lib.)

SAMUEL SCOTT, *Primary Examiner.*

US. Cl. X.R.

137—81.5